United States Patent
Park et al.

(10) Patent No.: US 9,883,686 B2
(45) Date of Patent: Feb. 6, 2018

(54) GLAZING AGENT FOR PASTRY PRODUCTS AND METHODS OF MANUFACTURING A GLAZING AGENT FOR PASTRY

(71) Applicant: PARIS CROISSANT CO., LTD., Seongnam-si, Gyeonggi-do (KR)

(72) Inventors: Chung-Kil Park, Seoul (KR); Cheon-Yong Lee, Seongnam-si (KR); Jung-Woo Kim, Seoul (KR); Chae-Sung Lim, Seoul (KR)

(73) Assignee: PARIS CROISSANT CO., LTD., Seongnam-si, Gyeonggi-Do (KR)

( * ) Notice: Subject to any disclaimer, the term of this patent is extended or adjusted under 35 U.S.C. 154(b) by 312 days.

(21) Appl. No.: 14/548,822

(22) Filed: Nov. 20, 2014

(65) Prior Publication Data
US 2015/0147455 A1    May 28, 2015

(30) Foreign Application Priority Data
Nov. 27, 2013    (KR) .......................... 10-2013-0145209

(51) Int. Cl.
| | | |
|---|---|---|
| *A23L 1/09* | (2006.01) | |
| *A23L 1/0524* | (2006.01) | |
| *A23L 1/00* | (2006.01) | |
| *A23P 20/10* | (2016.01) | |
| *A23L 29/231* | (2016.01) | |
| *A23L 29/30* | (2016.01) | |
| *A21D 13/24* | (2017.01) | |
| *A21D 13/28* | (2017.01) | |

(52) U.S. Cl.
CPC ............ *A23L 1/0047* (2013.01); *A21D 13/24* (2017.01); *A21D 13/28* (2017.01); *A23L 29/231* (2016.08); *A23L 29/30* (2016.08); *A23P 20/10* (2016.08)

(58) Field of Classification Search
CPC    A23L 1/09; A23L 29/30; A21D 13/24; A21D 13/28
USPC .......................................................... 426/577
See application file for complete search history.

(56) References Cited

U.S. PATENT DOCUMENTS

| | | | | |
|---|---|---|---|---|
| 3,419,402 | A * | 12/1968 | Laskin .................... | A21D 6/008 426/306 |
| 4,645,674 | A * | 2/1987 | Lang ...................... | A21D 13/28 426/302 |
| 2004/0228957 | A1 * | 11/2004 | Schmidt ................. | A23G 3/346 426/633 |
| 2006/0147564 | A1 * | 7/2006 | Kim ...................... | A61K 31/352 424/750 |
| 2007/0202225 | A1 * | 8/2007 | Chevalier .......... | A21D 13/0016 426/302 |
| 2009/0061058 | A1 * | 3/2009 | Jeong ....................... | A23B 9/02 426/392 |
| 2010/0196553 | A1 * | 8/2010 | Satoh ................. | A21D 13/0009 426/94 |

FOREIGN PATENT DOCUMENTS

| | | |
|---|---|---|
| JP | 2002-084974 | 3/2002 |
| JP | 2006-271291 | 10/2006 |
| JP | 2007-295923 A | 11/2007 |
| JP | 2008-245577 | 10/2008 |
| JP | 2011-120510 A | 6/2011 |
| KR | 10-0121138 | 3/1996 |
| KR | 10-2010-0090192 | 8/2010 |
| KR | 10-2012-0131076 | 12/2012 |
| KR | 10-1221601 | 1/2013 |
| KR | 10-1229996 | 2/2013 |

OTHER PUBLICATIONS

BeMiller J et al. In http://pubs.acs.org Publication date : Jun. 5,pp. 1-12, 1986 doi:10.1021/bk-1986-0310.ch001 Fishman and Jen; Chemistry and Function of Pectins ACS Symposium series; American Chemical Society : Washington,DC, 1986. http://pubs.acs.org/doi/pdf/10.1021/bk-1986-0310.ch001.*
NPL "Low Pressure Cooling" (in "Your Mother Was a Chemist" 2012, http:// kitchenscience.sci-toys.com/boiling_freezing_pressure).*
Nontasan et al. in APCBEF Procedia 2 (2012) 62-67.*

* cited by examiner

*Primary Examiner* — Amber R Orlando
*Assistant Examiner* — Bhaskar Mukhopadhyay
(74) *Attorney, Agent, or Firm* — patenttm.us

(57) ABSTRACT

Manufacturing a glazing agent bread or pastry products maintaining intrinsic tastes and flavors without destroying unique layered shape or collapsing the products. First prepare solution A by mixing 3 to 4 parts weight refined sugar and 0.5 to 1.5 parts weight amidated pectin, add 27 to 28 parts weight purified water, and dissolve at 80 to 85° C. for 20 to 25 minutes, second prepare solution B by mixing 0.2 to 0.3 parts by weight citric acid, 46 to 48 parts by weight starch syrup and 0.02 to 0.05 parts by weight black rice flavoring, adding 20 to 21 parts by weight purified water, heating at 60 to 65° C. for 10 to 15 minutes to dissolve, and third gelling the solution A and solution B by heating at 90 to 95° C. for 20 to 25 minutes to gel, and cooling the resulting mixture to room temperature.

3 Claims, 2 Drawing Sheets
(2 of 2 Drawing Sheet(s) Filed in Color)

GLAZING AGENT FOR PASTRY PRODUCTS AND METHODS OF MANUFACTURING A GLAZING AGENT FOR PASTRY

TECHNICAL FIELD

The present invention relates to a method of manufacturing a glazing agent for baking bread, and more particularly, to a method of manufacturing a glazing agent for pastry products capable of providing high-quality pastry bread having excellent marketability by making a surface of pastry bread smooth and simultaneously enhancing a gloss effect to improve appearance quality, forming a protective film to prevent the pastry bread from being dried due to evaporation of moisture, and also maintaining intrinsic taste and flavor of the pastry bread without destroying an unique layered shape and structure of the pastry bread or collapsing the pastry bread.

BACKGROUND ART

Generally, a high-concentration aqueous sugar solution, milk, egg yolk, or a gelatinized starch solution is applied onto a surface of bread which is well baked and tinged with brown in order to improve a gloss effect, add flavor, and give softness and crumbliness to bread or stimulate appetite.

However, when milk or egg yolk is applied onto the surface of bread, the milk or egg yolk is readily exposed to microorganisms, and the like, thereby providing the optimum conditions for multiplication of bacteria. As a result, bread deteriorates and spoils rapidly, which makes it inappropriate for mass-production, and the milk or egg yolk also has a poor drying property and high permeability of being absorbed into bread. Owing to their physical properties, the milk or egg yolk should be applied onto the surface of bread in a state in which the bread is somewhat dried. Accordingly, production efficiency may be significantly reduced since a large amount of time is required to bake bread.

Also, the gelatinized starch solution has a problem in that it has a somewhat insufficient effect since starch has a property in which gloss fades away and finally disappears with time due to the aging of starch.

Further, the milk, the egg yolk, or the gelatinized starch solution has a basic restriction on its use since it has a property of changing colors of a crust of bread due to a browning reaction (i.e., a Maillard reaction) in which sugar components in the bread react with amino acids, and also has a problem of causing damage to unique tastes of breads.

Therefore, various types of gel-phase or liquid-phase glazing agents for baking bread, which prevent evaporation of moisture, give gloss, and preserve flavors by forming a protective film on a surface of bread or a surface of a fruit for topping bread, have been proposed.

For example, a method of manufacturing a gel-phase glazing agent for cakes disclosed in Korean Registered Patent Publication No. 10-0121138, a coating agent for bakery foods, and a bakery food using the same disclosed in Korean Patent Application Publication No. 10-2010-0090192, a liquid-phase composition for coating a baking product, and a method of preparing the same disclosed in Korean Patent Application Publication No. 10-2012-0131076, and a glaze for coating a bakery fruit including fructooligosaccharides, and a method of preparing the same disclosed in Korean Registered Patent Publication No. 10-1229996 are known.

However, such conventional glazing agents have a problem in that a hole of a coating/spraying nozzle or a sprayer may be blocked due to high viscosity and mucosity, and machine equipment may be contaminated, which makes it difficult to clean the equipment.

Meanwhile, pastry bread is made by wrapping a lump of milk fat or butter with dough, rolling out the dough thinly, followed by repeatedly performing this process to form thin layers of the milk fat and the dough. In this case, the pastry bread may generally have approximately 27 to 250 layers of grain, and may typically have a very crispy food texture and spicy and plain tastes when many laminated layers are formed by overlapping the dough and the milk fat several times.

Such pastry bread has problems in that, when a conventional transparent gel-phase or liquid-phase glazing agent for baking bread, which has high mucosity, is applied onto a surface of bread to give gloss to the surface of bread, the intrinsic shape of bread may be destroyed or the bread may collapse due to morphological characteristics in which an internal phase of bread is thinly layered, resulting in easy deformation and damage to the appearance of bread, and the glazing agent may have a negative influence on the intrinsic tastes and flavors of pastries, resulting in a decrease in product value.

Also, the conventional transparent gel-phase or liquid-phase glazing agent for baking bread has limitations in which, since a lot of bubbles are generated when a defoamant and the like is not added, bread has poor transparency, resulting in a remarkable decrease in gloss intensity, and is also inconvenient and cumbersome to use in that it should be heated to at least a predetermined temperature due to high mucosity, and then used in order to uniformly coat a surface of bread to a predetermined thickness.

Therefore, there is a demand for development of a glazing agent which has no syneresis, dripping or permeation, can preserve and maintain intrinsic tastes and flavors and characteristics of pastry bread without destroying a unique layered shape of the bread, can minimize generation of bubbles to maximize gloss intensity, and be directly applied onto a surface of bread without performing an additional process when applied to the surface of bread.

PRIOR ART DOCUMENTS

Patent Documents

Patent Document 1: Korean Registered Patent Publication No. 10-0121138 (Mar. 22, 1996)
Patent Document 2: Korean Patent Application Publication No. 10-2010-0090192 (Aug. 13, 2010)
Patent Document 3: Korean Patent Application Publication No. 10-2012-0131076 (Dec. 4, 2012)
Patent Document 4: Korean Registered Patent Publication No. 10-1229996 (Feb. 6, 2013)
Patent Document 5: Korean Registered Patent Publication No. 10-1221601 (Jan. 14, 2013)
Patent Document 6: Japanese Patent Laid-open Publication No. 2002-084974 (Mar. 26, 2002)
Patent Document 7: Japanese Patent Laid-open Publication No. 2008-245577 (Oct. 16, 2008)
Patent Document 8: Japanese Patent Laid-open Publication No. 2006-271291 (Oct. 12, 2006)

DISCLOSURE

Technical Problem

Accordingly, the present inventors have tried to solve the above-described general issues and problems, and thus conducted arduous research to develop a glazing agent for pastry products which does not drip down during a process of applying to a surface of pastry bread, and also can maintain intrinsic tastes and flavors of pastry without destroying an unique layered shape and structure of the pastry or collapsing the pastry bread and inhibit and minimize generation of bubbles to enhance gloss intensity. Therefore, the present invention is completed based on the facts.

Therefore, the present invention is designed to solve the problems of the prior art, and therefore it is an object of the present invention to provide a glazing agent for pastry products capable of maintaining intrinsic tastes and flavors of pastry bread without destroying a unique layered shape and structure of the pastry bread or collapsing the pastry bread, and a method of manufacturing a glazing agent for pastry products.

It is another object of the present invention to provide a glazing agent for pastry products capable of minimizing generation of bubbles to maximize transparency and gloss intensity and also conveniently and uniformly being applied to a surface of bread without heating, and a method of manufacturing a glazing agent for pastry products.

Technical Solution

In order to accomplish the objects and solve the problems as described above, one exemplary embodiment of the present invention provides a method of manufacturing a glazing agent for pastry products, which includes a first operation of preparing a solution A by mixing 3 to 4 parts by weight of refined sugar and 0.5 to 1.5 parts by weight of amidated pectin, adding 27 to 28 parts by weight of purified water, and dissolving the resulting mixture by heating at 80 to 85° C. for 20 to 25 minutes, a second operation of preparing a solution B by mixing 0.2 to 0.3 parts by weight of citric acid, 46 to 48 parts by weight of starch syrup and 0.02 to 0.05 parts by weight of black rice flavoring, adding 20 to 21 parts by weight of purified water, and dissolving the resulting mixture by heating at 60 to 65° C. for 10 to 15 minutes, and a third operation of gelling the solution A and the solution B by heating the solution A and the solution B while stirring at 90 to 95° C. for 20 to 25 minutes to gel the solution, and cooling the resulting mixture to room temperature Therefore, the glazing agent according to one exemplary embodiment of the present invention may be used to maintain intrinsic tastes and flavors of pastry bread while preventing a unique layered shape and structure of the bread from being destroyed or collapsed, extend the use-by date without using a synthetic preservative and an antioxidant, and conveniently and uniformly be applied to a surface of the pastry bread without heating as well.

Also, according to a preferred embodiment of the present invention, the heating while stirring in the third operation may be performed at 90 to 95° C. and a rotational velocity of 2,000 to 2,500 rpm for 20 to 25 minutes after the solution A and the solution B are placed into a heating stirrer. Also, the heating while stirring may be performed until a sugar content of the mixture in which the solution A and the solution B are gelled reaches 47 to 50 Brix, and then the resulting mixture may be cooled. Therefore, the glazing agent may prevent syneresis, dripping or permeation from being caused when applied to a surface of the pastry bread.

In addition, according to a preferred embodiment of the present invention, the cooling in the third operation may be performed while applying a pressure of 0.7 to 0.8 bar after the mixture in which the solution A and the solution B are gelled is placed into a cooling tank. Therefore, the glazing agent may inhibit and minimize generation of bubbles to maximize transparency and gloss intensity of the mixture.

Further, another exemplary embodiment of the present invention provides a glazing agent for pastry products including purified water at 47 to 49 parts by weight, refined sugar at 3 to 4 parts by weight, amidated pectin at 0.5 to 1.5 parts by weight, citric acid at 0.2 to 0.3 parts by weight, starch syrup at 46 to 48 parts by weight, and black rice flavoring at 0.02 to 0.05 parts by weight.

Advantageous Effects

The glazing agent according to one exemplary embodiment of the present invention having the technical solution and configuration as described above can be useful in maintaining constant quality activity and uniformity in a state in which the glazing agent is finely grained and homogenized without being easily absorbed into the pastry bread or dripping down, thereby preventing a unique shape and structure of the pastry bread from being destructed or collapsed and minimizing a negative effect on the intrinsic tastes and flavors of the pastry bread.

Also, the glazing agent according to one exemplary embodiment of the present invention is formed through a sterilization process of killing microorganisms at a high temperature, and thus can be useful in extending the use-by date to the maximum without using a synthetic preservative and an antioxidant unlike in the prior art, and also useful in maximizing transparency and gloss intensity upon use by applying a pressure during a cooling process to minimize generation of bubbles in the glazing agent.

DESCRIPTION OF DRAWINGS

The patent or application file contains at least one drawing executed in color. Copies of this patent or patent application publication with color drawing(s) will be provided by the Office upon request and payment of the necessary fee.

BEST MODE

Figure 1:
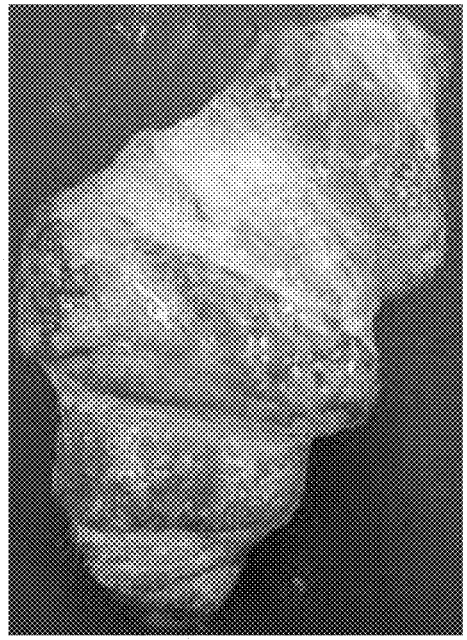
FIG. 1 is an image showing a pastry (i.e., a croissant) whose surface is coated with a glazing agent for pastry products according to one exemplary embodiment of the present invention.

Hereinafter, preferred embodiments of the present invention will be described in further detail referring to the accompanying drawings.

Prior to the description, it should be understood that the terminology used in the specification and appended claims should not be construed as defined in consideration of the functions in the present invention, but interpreted as a meaning of being widely used and generally recognized based on the meanings and concepts corresponding to technical aspects of the present invention.

Also, when it is determined that the detailed description of known art related to the present invention may obscure the gist of the present invention, such detailed description will be omitted.

The glazing agent composition for pastry products according to one exemplary embodiment of the present invention is configured to include refined sugar at 3 to 4 parts by weight, amidated pectin at 0.5 to 1.5 parts by weight, citric acid at 0.2 to 0.3 parts by weight, starch syrup at 46 to 48 parts by weight, and black rice flavoring at 0.02 to 0.05 parts by weight, based on 47 to 49 parts by weight of purified water, and thus may maintain unique flavors and tastes of a pastry while extraordinarily enhancing surface gloss of the pastry.

The purified water may be used at a content of 47 to 49% by weight, based on a total of 100% by weight of the glazing agent composition. For example, when the total content of the glazing agent composition is 100 g, the content of the purified water may be in a range of 47 to 49 g.

The refined sugar may be mixed at a content of 3 to 4% by weight, based on a total of 100% by weight of the glazing agent composition, so that the amidated pectin is completely dissolved to enhance proper mucosity and stability while promoting gelation.

The amidated pectin forms a gel via a hydrogen bond when predetermined amounts of a sugar and an acid are added. A quantity of charge of a charged carboxyl group which is hydrated when a pH of the amidated pectin is in a range of 3.3 to 3.7 is lowered, and a level of hydration is also reduced. As a result, gathering between pectin molecules occurs to form a junction, thereby forming a network structure as a whole. As a result, some of water molecules are in a confined state.

When the pH of the amidated pectin is in a range of 3.3 to 3.7, a gelling force is maintained excellently. That is, when the pH of the amidated pectin is greater than or equal to 4.0, the amount of the amidated pectin should increase, resulting in an increase in strength of a gel. On the other hand, when the pH of the amidated pectin is less than or equal to 3.0, acids decompose during heating, resulting in a decrease in gelling force or degraded quality.

When the content of the amidated pectin included in the entire glazing agent composition is less than 0.5% by weight, a degree of gelation may be degraded, and thus a gel structure may collapse, and sugar separation may occur. On the other hand, when the content of the amidated pectin is greater than 1.5% by weight, the strength of a gel phase may increase, resulting in a decrease in solubility.

Citric acid gives a flavor and serves as a buffer, and thus may prevent corrosion by means of pH control, and adjust a gelling rate and mucosity.

When the content of the starch syrup is less than 46 parts by weight, it is undesirable in aspects of flow prevention, syneresis prevention, and drying prevention. On the other hand, when the content of the starch syrup is greater than 48 parts by weight, shape stability and gloss intensity may be degraded due to high mucosity.

When the content of the black rice flavoring is less than 0.02 parts by weight, it is difficult to suppress or block an intrinsic flavor of the amidated pectin. On the other hand, when the content of the black rice flavoring is greater than 0.05 parts by weight, intrinsic flavors and the taste of a pastry may be deteriorated.

The glazing agent for pastry products according to one exemplary embodiment of the present invention thus configured may serve to make a surface of the pastry bread smooth, give moisturizing properties, and simultaneously provide a good gloss effect. Also, the glazing agent may serve to enhance flavors and maintain tastes, thereby remarkably enhancing taste, preference, and marketability.

The glazing agent for pastry products according to one exemplary embodiment of the present invention having such compositions may be prepared using the following method.

(First Operation)

3 to 4 parts by weight of refined sugar, and 0.5 to 1.5 parts by weight of amidated pectin are mixed, and 27 to 28 parts by weight of purified water is then added. The resulting mixture is dissolved by heating at 80 to 85° C. for 20 to 25 minutes, until the pectin is sufficiently dissolved, to prepare a solution A.

For example, first of all, 3 parts by weight of refined sugar and 0.5 parts by weight of amidated pectin are placed into a heating stirrer (commercially available from Woowon Technology Co., Ltd.; Model name: ULTRA HOMO MIXER), and mixed, and 27 parts by weight of purified water is added. Thereafter, the resulting mixture may be stirred at a rotational velocity of 2,000 rpm, mixed, and dissolved for 20 minutes by heating at 80 to 85° C. to prepare a homogenized solution A.

(Second Operation)

0.2 to 0.3 parts by weight of citric acid, 46 to 48 parts by weight of starch syrup, and 0.02 to 0.05 parts by weight of black rice flavoring are mixed, and 20 to 21 parts by weight of purified water is then added. The resulting mixture is dissolved by heating at 60 to 65° C. for 10 to 15 minutes to prepare a solution B.

For example, first of all, 0.2 parts by weight of citric acid, 46 parts by weight of starch syrup, and 0.02 parts by weight of black rice flavoring are placed into a heating stirrer (commercially available from Woowon Technology Co., Ltd.; Model name: ULTRA HOMO MIXER), stirred, and mixed, 207 parts by weight of purified water is added. Thereafter, the resulting mixture may be stirred at a rotational velocity of 2,000 rpm, mixed, and dissolved for 10 minutes by heating at 60 to 65° C. to prepare a homogenized solution B.

(Third Operation)

The solution A prepared in the first operation, and the solution B prepared in the second operation are placed into a heating stirrer (commercially available from Woowon Technology Co., Ltd.; Model name: ULTRA HOMO MIXER), heated at 90 to 95° C. for 20 to 25 minutes while stirring to gel the solutions A and B. Thereafter, the gelled mixture is cooled to room temperature.

In this case, the heating stirrer is set to a stirring rate of 2,000 to 2,500 rpm, and the solution A and the solution B may be heated while stirring and gelled. Then, the stirring rate of the heating stirrer is reduced, and the gelled mixture may be cooled until the sugar content of the mixture reaches 47 to 50 Brix.

For example, the solution A and the solution B may be placed into a heating stirrer, stirred at a rotational velocity of 2,000 rpm, and mixed by heating at 90 to 95° C. to gel the solution A and the solution B. In addition, the gelled mixture may be heated while stirring until the sugar content of the mixture reaches 47 Brix.

Here, when the rotational velocity of the heating stirrer is less than 2,000 rpm, the solution A and the solution B may not be sufficiently dissolved, resulting in lump formation. On the other hand, when the rotational velocity of the heating stirrer is greater than 2,500 rpm, a gel phase may be readily crushed.

Also, when the sugar content of the gelled mixture is less than or equal to 40 Brix, a shape retention property is not good due to low binding strength, the mixture may flow down when the mixture is applied to a surface of the pastry bread. On the other hand, when the sugar content of the gelled mixture is greater than or equal to 55 Brix, the intrinsic flavors and taste of the pastry bread may be negatively affected, a surface layer of the pastry bread may be destroyed, and a hard food texture may be given as well as a high strength.

Further, when the gelled mixture is cooled to room temperature, the gelled mixture may be cooled while applying a pressure of 0.7 to 0.8 bar to the cooling tank.

For example, the gelled mixture may be placed into a cooling tank, and cooled to room temperature while applying a pressure of 0.7 to 0.8 bar to the cooling tank, thereby minimizing generation of bubbles in the glazing agent. As a result, it is possible to maximize transparency and gloss intensity. That is, generation of bubbles may be suppressed without adding food additives such as a defoamant, etc.

Here, when the pressure in the cooling tank is less than 0.7 bar, the removal of bubbles may be lowered. On the other hand, when the pressure in the cooling tank is greater than 0.8 bar, a change in Brix of the mixture may be caused due to excessive concentration of the mixture.

Since microorganisms such as fungi, yeasts, aerobic bacteria, and the like are killed or growth of the microorganisms is inhibited in this third operation, it is possible to stably maintain the qualities, extend the use-by date due to a good preservative effect, and prevent stickiness of the glazing agent composition caused when the glazing agent composition is too diluted or poorly cured without using a synthetic preservative (such as sorbic acid) and an antioxidant, thereby enhancing coating workability and gloss and reducing dependence of sweetness on the refined sugar.

Meanwhile, the glazing agent composition for pastry products prepared by the method according to one exemplary embodiment of the present invention may be coated onto a surface of freshly baked bread to a predetermined thickness in a state in which the glazing agent composition is kept at room temperature or refrigerated for a predetermined period of time. When the glazing agent composition is refrigerated at a temperature of less than 3° C., workability may be degraded due to an increase in viscosity.

That is, when the glazing agent according to one exemplary embodiment of the present invention is coated onto a surface of a pastry under a room-temperature condition, cooled, and kept per se, the glazing agent is cured with a decrease in temperature, and stably settled down without dripping down on a surface of bread or being peeled off from the surface of bread in a state in which the surface of bread is glazed and is slightly moist and fresh to offer a feeling of refreshment.

Also, the glazing agent has an advantage in that the glazing agent is easily handled since the glazing agent has no syneresis and stickiness.

Here, a method of coating a glazing agent onto a surface of pastry bread includes a method of directly applying the glazing agent to a surface of pastry bread using a brush, etc., but the present invention is not limited thereto. For example, such a method that may be used herein may include a method of spraying a glazing agent using a sprayer, a method of coating a glazing agent by flowing down using a glazer, a method of depositing a glazing agent using a depositer, a method of introducing a pastry into a vessel containing a glazing agent and withdrawing the pastry from the vessel. In this case, the coating may be performed on part or all of a surface of a pastry.

MODE FOR INVENTION

EXAMPLE 1

3 parts by weight of refined sugar, and 0.5 parts by weight of amidated pectin were mixed, added with 27 parts by weight of purified water to a heating stirrer with a heating function, stirred at a rotational velocity of 2,000 rpm, mixed, and dissolved by heating at 80 to 85° C. for 20 minutes to prepare a homogenized solution A. In a separate procedure, 0.2 parts by weight of citric acid, 46 parts by weight of starch syrup, and 0.02 parts by weight of black rice flavoring were mixed, added with 20 parts by weight of purified water to a heating stirrer with a heating function, stirred at a rotational velocity of 2,000 rpm, mixed, and dissolved by heating at 60 to 65° C. for 10 minutes to prepare a solution B. Thereafter, the solution A and the solution B were placed into a heating stirrer with a heating function, stirred at a rotational velocity of 2,000 rpm, and mixed by heating at 90 to 95° C. to gel the solution A and the solution B. In this case, the gelled mixture was stirred for approximately 20 minutes until the sugar content of the mixture reached 47 Brix, placed into a cooling tank, and cooled to room temperature while applying a pressure of 0.7 bar to the cooling tank, thereby preparing a glazing agent composition for pastry products.

EXAMPLE 2

4 parts by weight of refined sugar, and 1 part by weight of amidated pectin were mixed, added with 28 parts by weight of purified water to a heating stirrer with a heating function, stirred at a rotational velocity of 2,000 rpm, mixed, and dissolved by heating at 80 to 85° C. for 20 minutes to prepare a homogenized solution A. In a separate procedure, 0.3 parts by weight of citric acid, 47 parts by weight of starch syrup, and 0.02 parts by weight of black rice flavoring were mixed, added with 20 parts by weight of purified water to a heating stirrer with a heating function, stirred at a rotational velocity of 2,000 rpm, mixed, and dissolved by heating at 60 to 65° C. for 10 minutes to prepare a solution B. Thereafter, the solution A and the solution B were placed into a heating stirrer with a heating function, stirred at a rotational velocity of 2,000 rpm, and mixed by heating at 90 to 95° C. to gel the solution A and the solution B. In this case, the gelled mixture was stirred for approximately 25 minutes until the sugar content of the mixture reached 50 Brix, placed into a cooling tank, and cooled to room temperature while applying a pressure of 0.8 bar to the cooling tank, thereby preparing a glazing agent composition for pastry products.

EXAMPLE 3

3 parts by weight of refined sugar, and 1.2 parts by weight of amidated pectin were mixed, added with 27 parts by weight of purified water to a heating stirrer with a heating function, stirred at a rotational velocity of 2,000 rpm, mixed, and dissolved by heating at 80 to 85° C. for 20 minutes to prepare a homogenized solution A. In a separate procedure, 0.3 parts by weight of citric acid, 48 parts by weight of starch syrup, and 0.04 parts by weight of black rice flavoring were mixed, added with 21 parts by weight of purified water to a heating stirrer with a heating function, stirred at a rotational velocity of 2,000 rpm, mixed, and dissolved by heating at 60 to 65° C. for 10 minutes to prepare a solution B. Thereafter, the solution A and the solution B were placed into a heating stirrer with a heating function, stirred at a rotational velocity of 2,000 rpm, and mixed by heating at 90 to 95° C. to gel the solution A and the solution B. In this case, the gelled mixture was stirred for approximately 25 minutes until the sugar content of the mixture reached 48 Brix, placed into a cooling tank, and cooled to room temperature while applying a pressure of 0.7 bar to the cooling tank, thereby preparing a glazing agent composition for pastry products.

EXAMPLE 4

4 parts by weight of refined sugar, and 1.5 parts by weight of amidated pectin were mixed, added with 28 parts by weight of purified water to a heating stirrer with a heating function, stirred at a rotational velocity of 2,000 rpm, mixed, and dissolved by heating at 80 to 85° C. for 20 minutes to prepare a homogenized solution A. In a separate procedure, 0.3 parts by weight of citric acid, 47 parts by weight of starch syrup, and 0.03 parts by weight of black rice flavoring were mixed, added with 21 parts by weight of purified water to a heating stirrer with a heating function, stirred at a rotational velocity of 2,000 rpm, mixed, and dissolved by heating at 60 to 65° C. for 10 minutes to prepare a solution B. Thereafter, the solution A and the solution B were placed into a heating stirrer with a heating function, stirred at a rotational velocity of 2,000 rpm, and mixed by heating at 90 to 95° C. to gel the solution A and the solution B. In this case, the gelled mixture was stirred for approximately 25 minutes until the sugar content of the mixture reached 48 Brix, placed into a cooling tank, and cooled to room temperature while applying a pressure of 0.7 bar to the cooling tank, thereby preparing a glazing agent composition for pastry products.

EXAMPLE 5

3 parts by weight of refined sugar, and 1.2 parts by weight of amidated pectin were mixed, added with 27 parts by weight of purified water to a heating stirrer with a heating function, stirred at a rotational velocity of 2,000 rpm, mixed, and dissolved by heating at 80 to 85° C. for 20 minutes to prepare a homogenized solution A. In a separate procedure, 0.3 parts by weight of citric acid, 48 parts by weight of starch syrup, and 0.02 parts by weight of black rice flavoring were mixed, added with 20 parts by weight of purified water to a heating stirrer with a heating function, stirred at a rotational velocity of 2,000 rpm, mixed, and dissolved by heating at 60 to 65° C. for 10 minutes to prepare a solution B. Thereafter, the solution A and the solution B were placed into a heating stirrer with a heating function, stirred at a rotational velocity of 2,000 rpm, and mixed by heating at 90 to 95° C. to gel the solution A and the solution B. In this case, the gelled mixture was stirred for approximately 20 minutes until the sugar content of the mixture reached 48 Brix, placed into a cooling tank, and cooled to room temperature while applying a pressure of 0.8 bar to the cooling tank, thereby preparing a glazing agent composition for pastry products.

COMPARATIVE EXAMPLE 1

3 parts by weight of refined sugar, and 1.2 parts by weight of amidated pectin were mixed, added with 27 parts by weight of purified water to a heating stirrer with a heating function, stirred at a rotational velocity of 2,000 rpm, mixed, and dissolved by heating at 80 to 85° C. for 20 minutes to prepare a homogenized solution A. In a separate procedure, 0.3 parts by weight of citric acid, and 48 parts by weight of starch syrup were mixed, added with 20 parts by weight of purified water to a heating stirrer with a heating function, stirred at a rotational velocity of 2,000 rpm, mixed, and dissolved by heating at 60 to 65° C. for 10 minutes to prepare a solution B. Thereafter, the solution A and the solution B were placed into a heating stirrer with a heating function, stirred at a rotational velocity of 2,000 rpm, and mixed by heating at 90 to 95° C. for 10 minutes to gel the solution A and the solution B. Then, the gelled mixture was cooled to room temperature to prepare a glazing agent composition for pastry products.

COMPARATIVE EXAMPLE 2

4 parts by weight of refined sugar, and 1.5 parts by weight of amidated pectin were mixed, added with 28 parts by weight of purified water to a heating stirrer with a heating function, stirred at a rotational velocity of 2,000 rpm, mixed, and dissolved by heating at 80 to 85° C. for 20 minutes to prepare a homogenized solution A. In a separate procedure, 0.3 parts by weight of citric acid, and 47 parts by weight of starch syrup were mixed, added with 21 parts by weight of purified water to a heating stirrer with a heating function, stirred at a rotational velocity of 2,000 rpm, mixed, and dissolved by heating at 60 to 65° C. for 10 minutes to prepare a solution B. Thereafter, the solution A and the solution B were placed into a heating stirrer with a heating function, stirred at a rotational velocity of 2,000 rpm, and mixed by heating at 90 to 95° C. for 15 minutes to gel the solution A and the solution B. Then, the gelled mixture was cooled to room temperature to prepare a glazing agent composition for pastry products.

EXPERIMENTAL EXAMPLE 1

Comparison of Applied States of Pastries

A predetermined amount of the above-described glazing agent for pastry products prepared in Example 1 was applied to a surface of a croissant prepared by a skilled baker using a brush for bakery products by the skilled baker. Thereafter, an applied state of the croissant was observed.

Figure 2:
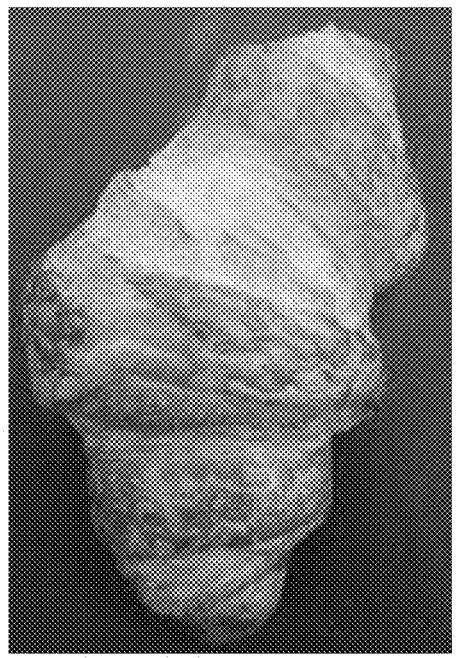
FIG. 2 is an image showing the pastry (i.e., a croissant) before the surface of the pastry is coated with the glazing agent for pastry products according to one exemplary embodiment of the present invention.

From the test results, as shown in FIG. 1, it could be seen that the glazing agent prepared in Example 1 was easily absorbed into the croissant, or dripped down, and also the intrinsic shape and structure of the croissant were not destroyed or collapsed, compared to the croissant before the glazing agent was applied to the surface of the croissant as shown in FIG. 2.

Figure 3:
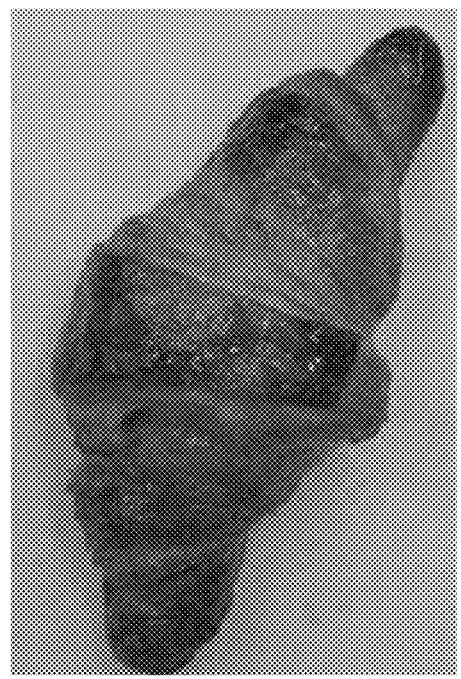
FIG. 3 is an image showing the pastry (i.e., a croissant) 24 hours after the surface of the pastry is coated with the glazing agent for pastry products according to one exemplary embodiment of the present invention.

As shown in FIG. 3, it could also be seen that the intrinsic shape and structure of the croissant were not destroyed or collapsed even when the glazing agent of Example 1 was applied to a surface of the croissant and kept for 24 hours, and also the glazing agent was not peeled off from the surface of the croissant, and the gloss of the croissant was maintained intact, indicating that the appearance, food texture and coated state of the croissant were stably preserved.

EXPERIMENTAL EXAMPLE 2

Organoleptic Test

A predetermined amount of each of the above-described glazing agents for pastry products prepared in Examples 1 to 5 and Comparative Examples 1 and 2 was applied to a surface of a croissant prepared by a skilled baker using a brush for bakery products by the skilled baker. Thereafter, an organoleptic test was performed on the glazing agents for pastry products, and average values were calculated for the items. As a result, the characteristics of the glazing agents for pastry products are listed in Table 1 below.

In this case, 10 students were selected as evaluation participants in consideration of a degree of interest in a reliability test, and received an education on the objects of the test and an evaluation method. Then, the organoleptic test was performed.

Also, the tasting order is as follows: the sensory test participants ate one sample, recorded the evaluation results on the sample, essentially rinsed their mouths with pure water for several seconds, ate another sample, and recorded the evaluation results on the another sample.

The evaluation was performed on each item using a 9-point scale method (1 point: very bad, 3 points: bad, 5 points: average, 7 points: good, and 9 points: very good), and an average value of each item was calculated.

Further, the evaluation was performed in the order of stability, gloss intensity, transparency, taste, and flavor. Among the evaluation items, the glazing agent was evaluated for stability directly after the glazing agent was applied to a surface of the croissant, and the glazing agent was evaluated for gloss intensity, transparency, taste and flavor 24 hours after the glazing agent was applied to a surface of the croissant.

TABLE 1

| Items | Stability | Gloss intensity | Transparency | Taste | Flavor |
|---|---|---|---|---|---|
| Example 1 | 8.3 | 7.9 | 8.7 | 6.3 | 6.7 |
| Example 2 | 8.2 | 8.0 | 8.6 | 6.4 | 7.1 |
| Example 3 | 8.3 | 8.3 | 8.2 | 6.8 | 7.0 |
| Example 4 | 8.5 | 8.1 | 8.5 | 6.5 | 6.8 |
| Example 5 | 8.4 | 8.0 | 8.4 | 6.4 | 6.7 |
| Comparative Example 1 | 7.3 | 6.3 | 7.3 | 6.3 | 6.0 |
| Comparative Example 2 | 7.1 | 6.9 | 7.2 | 6.2 | 6.1 |

As listed in Table 1, each of the glazing agents for pastry products according to one exemplary embodiment of the present invention, as prepared in Examples 1 to 5 and Comparative Examples 1 and 2, was applied to a surface of the croissant, and evaluated using various organoleptic tests. As a result, it was revealed that there was no significant difference in taste between the glazing agents for pastry products of Examples 1 to 5 and Comparative Examples 1 and 2 among the evaluation items, but the glazing agents for pastry products of Examples 1 to 5 were generally evaluated to have excellent properties such as stability, gloss intensity, transparency and flavor, compared to the glazing agents for pastry products of Comparative Examples 1 and 2.

That is, it was confirmed that the glazing agent composition for pastry products according to one exemplary embodiment of the present invention had excellent storability since the glazing agent composition was not easily spoiled and decayed by microorganisms, and also remarkably improved a surface gloss effect of pastry bread and had a special effect in maintaining unique tastes of the pastry bread since the glazing agent composition maintained constant quality activity and uniformity even in a state in which the glazing agent composition was finely grained and homogenized without being easily absorbed into the pastry bread when the glazing agent composition was coated onto a surface of the pastry bread.

Meanwhile, in the present invention, the term "glazing agent" refers to a component which is coated onto surfaces of various types of bread, such as baked bread or fried doughnuts, to give flavors or a gloss effect while maintaining a moisturizing property.

Also, according to one exemplary embodiment of the present invention, the pastry may be prepared using various bread-making methods, but types of the methods are not particularly limited. Further, examples of the breads of pastry may include puff pastries, pies, Danish pastries, croissants, rolls of bread, brioches, viennoiseries, etc.

The present invention has been described in detail with reference to the accompanying drawings. However, it should be understood that the detailed description and specific examples, while indicating preferred embodiments of the invention, are given by way of illustration only, since various changes and modifications within the scope of the invention will become apparent to those skilled in the art from this detailed description.

Therefore, it should be interpreted that the contents regarding modifications and applications of the features and objects of the present invention are comprised within the scope of the present invention.

The invention claimed is:

1. A method of manufacturing a glazing agent for pastry products, comprising the following operations:
   (A) a first operation of preparing a solution A by mixing 3 to 4 parts by weight of refined sugar and 0.5 to 1.5 parts by weight of amidated pectin, adding 27 to 28 parts by weight of purified water, and dissolving the resulting mixture by heating at 80 to 85° C. for 20 to 25 minutes;
   (B) a second operation of preparing a solution B by mixing 0.2 to 0.3 parts by weight of citric acid, 46 to 48 parts by weight of starch syrup and 0.02 to 0.05 parts by weight of black rice flavoring, adding 20 to 21 parts by weight of purified water, and dissolving the resulting mixture by heating at 60 to 65° C. for 10 to 15 minutes; and
   (C) a third operation of gelling the solution A and the solution B by heating the solution A and the solution B while stirring at 90 to 95° C. for 20 to 25 minutes to gel the solution, and cooling the resulting mixture to room temperature.

2. The method of claim 1, wherein the heating while stirring in the third operation is performed at 90 to 95° C. and a rotational velocity of 2,000 to 2,500 rpm for 20 to 25 minutes after the solution A and the solution B are placed into a heating stirrer, and
   the heating while stirring is performed until a sugar content of the mixture in which the solution A and the solution B are gelled reaches 47 to 50 Brix.

3. The method of claim 1, wherein the cooling in the third operation is performed while applying a pressure of 0.7 to 0.8 bar after the mixture in which the solution A and the solution B are gelled is placed into a cooling tank.

* * * * *